United States Patent
Kobayashi et al.

(10) Patent No.: US 11,529,952 B2
(45) Date of Patent: Dec. 20, 2022

(54) ON-VEHICLE CONTROL DEVICE, TRAVELING SPEED CONTROL METHOD, AND COMPUTER PROGRAM

(71) Applicant: SUMITOMO ELECTRIC INDUSTRIES, LTD., Osaka (JP)

(72) Inventors: Masafumi Kobayashi, Osaka (JP); Hiroyuki Ishimaru, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 194 days.

(21) Appl. No.: 16/633,665

(22) PCT Filed: Jul. 26, 2018

(86) PCT No.: PCT/JP2018/028123
§ 371 (c)(1),
(2) Date: Jan. 24, 2020

(87) PCT Pub. No.: WO2019/022201
PCT Pub. Date: Jan. 31, 2019

(65) Prior Publication Data
US 2021/0053566 A1 Feb. 25, 2021

(30) Foreign Application Priority Data
Jul. 28, 2017 (JP) .............................. JP2017-146746

(51) Int. Cl.
*B60W 30/00* (2006.01)
*B60W 30/14* (2006.01)
(Continued)

(52) U.S. Cl.
CPC .... *B60W 30/143* (2013.01); *B60W 30/18154* (2013.01); *B60W 40/04* (2013.01);
(Continued)

(58) Field of Classification Search
CPC ...... G06K 9/46; G06K 9/4661; G06K 9/6256; G06K 9/6271; G06K 9/6277;
(Continued)

(56) References Cited

U.S. PATENT DOCUMENTS 9,558,666 B2 * 1/2017 Jansson .................... G08G 1/08
9,633,560 B1 * 4/2017 Gao ......................... G08G 1/07
(Continued)

FOREIGN PATENT DOCUMENTS

GB 2452835 A 3/2009
JP 2006-139707 A 6/2006
(Continued)

*Primary Examiner* — Ian Jen
(74) *Attorney, Agent, or Firm* — Faegre Drinker Biddle & Reath LLP

(57) ABSTRACT

A device according to one aspect of the present disclosure is an on-vehicle control device configured to control a traveling speed of a vehicle including the on-vehicle control device. The on-vehicle control device includes: an acquisition unit configured to acquire a present light color of a traffic light unit installed at an intersection; a calculation unit configured to calculate an avoidance position and an avoidance speed with respect to a dilemma zone at a time when yellow light starts; and a control unit configured to execute a first deceleration process of reducing the traveling speed of the vehicle at the avoidance position to a speed equal to or lower than the avoidance speed, in a case where a present position of the vehicle is on an upstream side relative to the avoidance position and the present light color is green.

7 Claims, 8 Drawing Sheets

(51) Int. Cl.
  *B60W 30/18* (2012.01)
  *B60W 40/04* (2006.01)
  *G08G 1/01* (2006.01)
(52) U.S. Cl.
  CPC ....... *G08G 1/0116* (2013.01); *B60W 2552/00* (2020.02); *B60W 2555/60* (2020.02)
(58) Field of Classification Search
  CPC ......... B60W 2555/60; B60W 2554/00; B60W 2420/42; B60W 30/09; B60W 2554/80; B60W 10/20; B60W 30/18154; B60W 2556/50; B60W 30/12; B60W 30/14; B60W 2710/207; B60W 30/00; B60W 30/16; B60W 2552/15; B60W 2552/30; B60W 2554/4041; B60W 30/18163; B60W 50/14; B60W 2754/30; B60W 10/06; B60W 2554/801; B60W 2554/804; B60W 10/08; B60W 2050/143; B60W 30/143; B60W 30/17; B60W 2050/146; B60W 2520/105; B60W 2720/10; B60W 30/095

See application file for complete search history.

(56) References Cited

U.S. PATENT DOCUMENTS

| | | | |
|---|---|---|---|
| 9,707,960 B2 * | 7/2017 | Gutmann | ......... G08G 1/096725 |
| 2010/0305804 A1 | 12/2010 | Taguchi | |
| 2012/0146811 A1 | 6/2012 | Chou et al. | |
| 2017/0124869 A1 | 5/2017 | Popple | |
| 2017/0178506 A1 * | 6/2017 | Witte | ............... G08G 1/096827 |

FOREIGN PATENT DOCUMENTS

| | | |
|---|---|---|
| JP | 2008-302849 A | 12/2008 |
| JP | 2010-274887 A | 12/2010 |
| JP | 2016-136375 A | 7/2016 |

* cited by examiner

ON-VEHICLE CONTROL DEVICE, TRAVELING SPEED CONTROL METHOD, AND COMPUTER PROGRAM

TECHNICAL FIELD

The present invention relates to an on-vehicle control device, a traveling speed control method, and a computer program.

This application claims priority on Japanese Patent Application No. 2017-146746 filed on Jul. 28, 2017, the entire contents of which are incorporated herein by reference.

BACKGROUND ART

For the purpose of supporting safe and secure traveling of vehicles, a traffic signal controller, which causes a roadside communication device to provide vehicles with the remaining number of seconds of a traffic light color at the present time point (e.g., the number of seconds during which green light will continue), has been developed (refer to Patent Literature 1, for example).

CITATION LIST

Patent Literature

PATENT LITERATURE 1: Japanese Laid-Open Patent Publication No. 2016-136375

SUMMARY OF INVENTION (1) A device according to one aspect of the present disclosure is an on-vehicle control device configured to control a traveling speed of a vehicle including the on-vehicle control device. The on-vehicle control device includes: an acquisition unit configured to acquire a present light color of a traffic light unit installed at an intersection; a calculation unit configured to calculate an avoidance position and an avoidance speed with respect to a dilemma zone at a time when yellow light starts; and a control unit configured to execute a first deceleration process of reducing the traveling speed of the vehicle at the avoidance position to a speed equal to or lower than the avoidance speed, in a case where a present position of the vehicle is on an upstream side relative to the avoidance position and the present light color is green.

(6) A method according to one aspect of the present disclosure is a method of controlling a traveling speed of a vehicle. The method includes: acquiring a present light color of a traffic light unit installed at an intersection; calculating an avoidance position and an avoidance speed with respect to a dilemma zone at a time when yellow light starts; and executing a first deceleration process of reducing the traveling speed of the vehicle at the avoidance position to a speed equal to or lower than the avoidance speed, in a case where a present position of the vehicle is on an upstream side relative to the avoidance position and the present light color is green.

(7) A computer program according to one aspect of the present disclosure is a computer program configured to cause a computer to function as an on-vehicle control device that controls a traveling speed of a vehicle including the on-vehicle control device. The computer program causes the computer to function as: an acquisition unit configured to acquire a present light color of a traffic light unit installed at an intersection; a calculation unit configured to calculate an avoidance position and an avoidance speed with respect to a dilemma zone at a time when yellow light starts; and a control unit configured to execute a first deceleration process of reducing the traveling speed of the vehicle at the avoidance position to a speed equal to or lower than the avoidance speed, in a case where a present position of the vehicle is on an upstream side relative to the avoidance position and the present light color is green.

DESCRIPTION OF EMBODIMENTS

Figure 1:
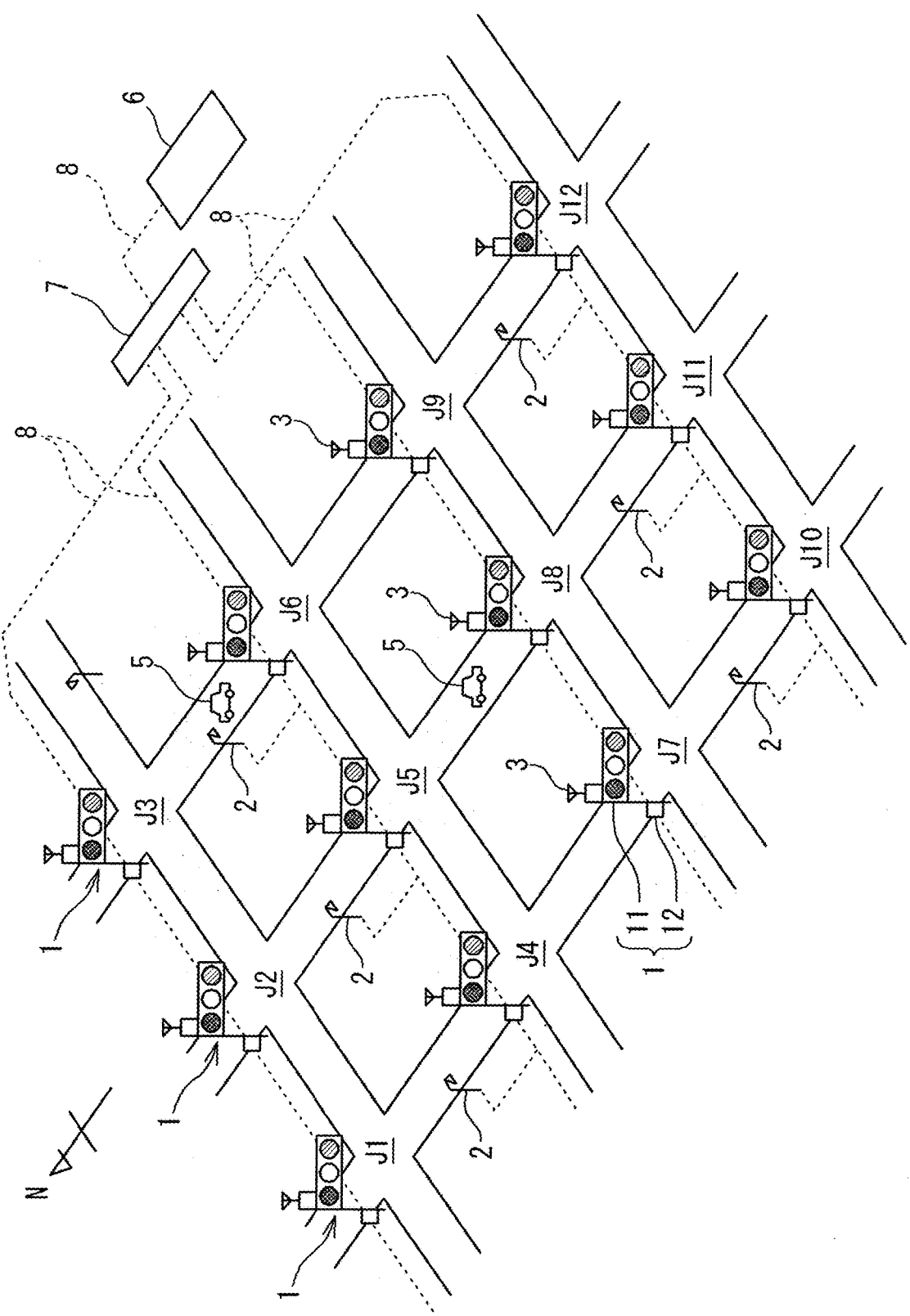
FIG. 1 is a road plan view showing an entire configuration of a traffic control system.

Problems to be Solved by the Disclosure

Under the existing circumstances, however, most traffic signal controllers do not have the function of providing vehicles with the remaining number of seconds of a traffic light color at the present time point, and huge cost and time are required for update to this function. Even when a traffic signal controller has a function of outputting traffic signal information, breakdown or maintenance may make the traffic signal controller incapable of providing the remaining number of seconds of a traffic light color.

When the roadside communication device cannot provide a vehicle with the remaining number of seconds of a traffic light color, problems described below may occur, particularly, when the vehicle is an automated vehicle.

For example, in the case where the vehicle recognizes the traffic light color with an on-vehicle sensor, if an arrow light unit, rising sun, setting sun, or the like overlaps the traffic light unit, it becomes difficult for the sensor to recognize the traffic light color, resulting in necessity of switching to manual driving. Meanwhile, in the case where the traffic light unit is in a blind spot due to a preceding large vehicle or the like, if the preceding vehicle forcefully enters the intersection with yellow light or red light, the automated vehicle may commit a traffic violation such as ignoring a traffic signal.

Therefore, it is conceivable that a traffic signal controller generates a state of light color at the present time point (hereinafter also referred to as "present light color") from a driving current or the like of the traffic light unit, and a roadside communication device wirelessly transmits the generated present light color to vehicles in almost real time.

However, the present light color being provided to vehicles is not enough for vehicles traveling on an inflow road to an intersection to determine a time point at which yellow light will be started, which may result in a risk that an automated vehicle undesirably enters a dilemma zone, and ignores the traffic light or rapidly decelerates.

The present disclosure has been made in view of the above problems, and an object of the present disclosure is to provide an on-vehicle control device, etc., capable of preventing a vehicle including the on-vehicle control device from entering a dilemma zone.

Effect of the Present Disclosure

As described above, according to the present disclosure, it is possible to prevent a vehicle from entering a dilemma zone.

Outline of Embodiment of the Present Disclosure

Hereinafter, the outline of an embodiment of the present disclosure is listed and described.

(1) An on-vehicle control device according to the present embodiment is an on-vehicle control device configured to control a traveling speed of a vehicle including the on-vehicle control device. The on-vehicle control device includes: an acquisition unit configured to acquire a present light color of a traffic light unit installed at an intersection; a calculation unit configured to calculate an avoidance position and an avoidance speed with respect to a dilemma zone at a time when yellow light starts; and a control unit configured to execute a first deceleration process of reducing the traveling speed of the vehicle at the avoidance position to a speed equal to or lower than the avoidance speed, in a case where a present position of the vehicle is on an upstream side relative to the avoidance position and the present light color is green.

According to the on-vehicle control device of the present embodiment, when the present position of the vehicle is on the upstream side relative to the avoidance position and the present light color is green, the control unit executes the first deceleration process of reducing the traveling speed of the vehicle at the avoidance position to a speed equal to or lower than the avoidance speed. Therefore, the vehicle is prevented from entering the dilemma zone.

(2) In the on-vehicle control device of the present embodiment, the control unit preferably executes a second deceleration process of causing the vehicle to stop before the intersection, in a case where the present position of the vehicle is on the upstream side relative to the avoidance position and the present light color is yellow.

In this case, since the control unit executes the second deceleration process, the vehicle is prevented from forcefully entering the intersection when the present light color at the intersection has changed to yellow.

(3) In the on-vehicle control device of the present embodiment, the control unit preferably executes a passage determination process of determining whether or not to cause the vehicle to pass through the intersection, according to the speed of the vehicle at the avoidance position, in a case where the present position of the vehicle coincides with the avoidance position or is on a downstream side relative to the avoidance position.

In this case, since the control unit executes the passage determination process according to the speed of the vehicle at the avoidance position, it is possible to appropriately determine whether the vehicle should pass through the intersection or stop before the intersection.

(4) In the on-vehicle control device of the present embodiment, in a case where the acquisition unit acquires, as traffic signal information at the intersection, only the traffic light color or only the traffic light color and a yellow interval, the calculation unit may calculate the avoidance position and the avoidance speed by using a straight line Ls described below:

$$Ls = Y \times V$$

where Y is the yellow interval, and V is the traveling speed.

The reason is as follows. In an intersection where only a traffic light color is provided or only the traffic light color and a yellow interval are provided as traffic signal information of the intersection, it is preferable to calculate the avoidance position and the avoidance speed with respect to the dilemma zone by using the straight line Ls described above.

(5) In the on-vehicle control device of the present embodiment, in a case where the acquisition unit further acquires, as traffic signal information at the intersection, traffic signal information in which a minimum number of remaining seconds of green light is different from a maximum number of remaining seconds of the green light, the calculation unit may calculate the avoidance position and the avoidance speed by using a straight line Lsg described below:

$$Lsg = (Y + G \min) \times V$$

where Y is the yellow interval, Gmin is the minimum number of remaining seconds, and V is the traveling speed.

The reason is as follows. In an intersection where the minimum number of remaining seconds Gmin of green light does not coincide with the maximum number of remaining seconds Gmax of the green light, since local-actuated control such as gap-actuated control is being executed, it is preferable to calculate the avoidance position and the avoidance speed with respect to the dilemma zone by using the straight line Lsg described above.

(6) A control method of the present embodiment relates to a control method executed by the on-vehicle control device according to any one of the above (1) to (5).

Therefore, the control method of the present embodiment exhibits effects similar to those of the on-vehicle control device according to any one of the above (1) to (5).

(7) A computer program of the present embodiment relates to a computer program that causes a computer to function as the on-vehicle control device according to any one of the above (1) to (5).

Therefore, the computer program of the present embodiment exhibits effects similar to those of the on-vehicle control device according to any one of the above (1) to (5).

Details of Embodiment of the Present Disclosure

Hereinafter, details of the embodiment of the present disclosure will be described with reference to the drawings. At least some parts of the embodiment described below may be combined together as desired.

[Overall Configuration of Traffic Control System]

FIG. 1 is a perspective view showing the overall configuration of a traffic control system according to the present embodiment.

As shown in FIG. 1, the traffic control system according to the present embodiment includes, for example, traffic signal units 1, roadside detectors 2, roadside communication devices 3, vehicles 5 capable of wirelessly communicating with the roadside communication devices 3, and a central apparatus 6 that performs traffic control by controlling the traffic signal units 1 in a coverage area that the central apparatus 6 covers.

Figure 2:
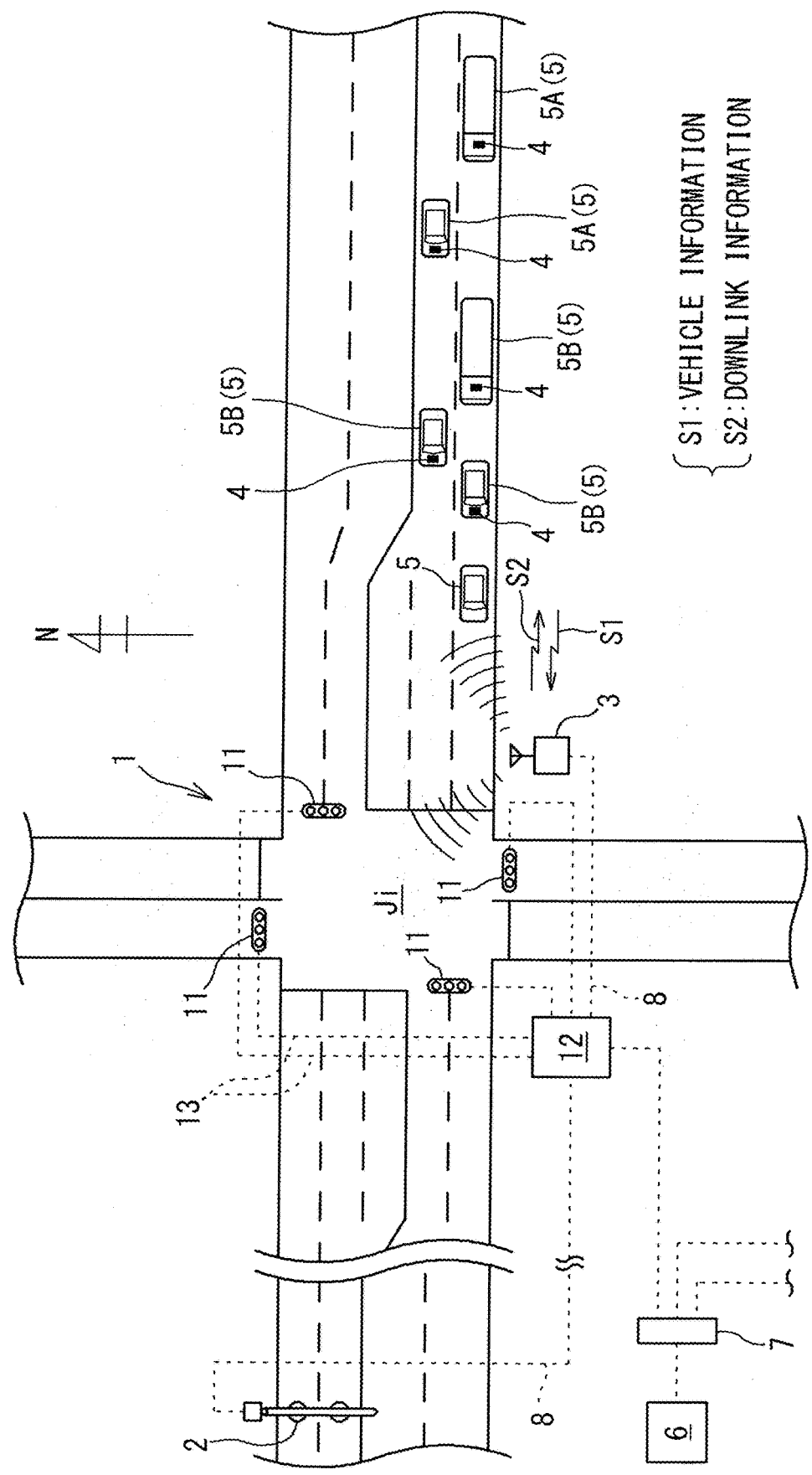
FIG. 2 is a road plan view showing an example of arrangement of roadside devices around an intersection.

The vehicles 5 include "equipped vehicles" that are equipped with on-vehicle communication units 4 capable of communicating with the roadside communication devices 3, and "non-equipped vehicles" that are not equipped with on-vehicle communication units 4 (refer to FIG. 2).

Further, the vehicles 5 include "automated vehicles 5A" that are capable of automated driving, and "usual vehicles 5B" that are incapable of automated driving, in other words, that are manually operated (refer to FIG. 2).

Each traffic signal unit 1 includes: a plurality of traffic light units 11 (only one of them is shown in FIG. 1) that are installed on inflow roads to an intersection and display presence/absence of right of way; and a traffic signal controller 12 that controls timings of turn-on and turn-off of round lights, etc., included in each traffic light unit 11.

The traffic signal controller 12 is installed at each of a plurality of intersections Ji (i=1 to 12 in FIG. 1) included in the coverage area of the central apparatus 6. The traffic signal controllers 12 are connected to a router 7 via dedicated communication lines 8 such as telephone lines.

The router 7 is connected to the central apparatus 6 in the traffic control center via a communication line 8. The central apparatus 6 establishes a LAN (Local Area Network) with the traffic signal controllers 12 installed at the respective intersections Ji included in the coverage area of the central apparatus 6.

Therefore, the central apparatus 6 can communicate with the traffic signal controllers 12 in the coverage area, and each traffic signal controller 12 can communicate with the traffic signal controllers 12 installed at other intersections Ji. The central apparatus 6 may be installed not inside the traffic control center but on a road.

The roadside detectors 2 are installed at appropriate locations on the roads in the coverage area, mainly for the purpose of counting the number of vehicles that enter the intersections Ji.

Each roadside detector 2 includes at least one of: a vehicle detector that detects a vehicle 5 traveling directly below the detector by using an ultrasonic wave of the like; a loop coil that detects a vehicle 5 by an inductance change; a monitor camera that time-sequentially photographs the traveling states of vehicles 5; an optical beacon that performs optical communication through near-infrared rays with vehicles 5; and the like.

Each roadside communication device 3 is installed near one or a plurality of intersections Ji included in the coverage area of the central apparatus 6. In the example of FIG. 1, all the intersections J1 to J12 are provided with roadside communication devices 3. However, only some intersections Ji in the coverage area, such as major intersections, may be provided with roadside communication devices 3.

Each roadside communication device 3 can receive a communication frame of vehicle-to-vehicle communication that is wirelessly performed by the on-vehicle communication units 4 of the vehicles 5 traveling on the road, and can wirelessly transmit, to the on-vehicle communication units 4, a communication frame including information targeted to vehicles.

The roadside communication devices 3 are connected to the communication lines 8 via, for example, the traffic signal controllers 12, or relay devices (not shown) installed on the roadside. Therefore, the roadside communication devices 3 are communicable with the central apparatus 6 through wired communication via the communication lines 8.

Each on-vehicle communication unit 4 is a wireless communication unit for performing wireless communication (vehicle-to-vehicle communication) with other vehicles 5 traveling on the road. The on-vehicle communication unit 4 can receive a communication frame, including information targeted to vehicles, which is downlink-transmitted from each roadside communication device 3.

The on-vehicle communication unit 4 may have an optical communication function of performing, in a communication area beneath an optical beacon, optical communication with the optical beacon through near-infrared rays.

The central apparatus 6 is composed of one or a plurality of server computers owned by a business entity for traffic control. The central apparatus 6 collects, for example, "detector information" measured by the roadside detectors 2, and "vehicle-to-vehicle communication information" (hereinafter also referred to as "vehicle information") received from the vehicles 5 by the roadside communication devices 3.

The detector information includes, for example, pulse signals detected by the vehicle detectors, and beacon information received from optical-communication-compliant on-vehicle communication units 4 by the optical beacons. Each vehicle-to-vehicle communication information includes the vehicle ID, time, position, speed, etc., of a vehicle 5 that has generated the information.

The central apparatus 6 calculates traffic indices such as inflow traffic volumes at the intersections Ji by using various types of data having been collected. Based on the calculated traffic indices, the central apparatus 6 performs traffic-actuated control (central-actuated control) for the intersections Ji that belong to the coverage area thereof.

Examples of the traffic-actuated control performed by the central apparatus 6 include: "coordinated control" for controlling a group of traffic signal units 1 at intersections Ji that belong to a predetermined coordinated section; and "wide-area control (area traffic control)" in which the coordinated control is expanded onto a road network.

In executing the traffic-actuated control, the central apparatus 6 generates traffic signal control parameters including cycle, split, offset, etc. The central apparatus 6 transmits the generated traffic signal control parameters to the traffic signal controllers 12 installed at the intersections Ji to be subjected to the traffic-actuated control.

As described above, the traffic control system according to the present embodiment adopts a wireless communication system such as ITS (Intelligent Transport Systems) in which the central apparatus 6 collects the vehicle-to-vehicle communication information received from the vehicles 5 by the roadside communication devices 3, and uses the collected information as data for traffic control.

[Roadside Devices Around Intersection]

FIG. 2 is a road plan view showing an example of arrangement of roadside devices around an intersection.

As shown in FIG. 2, roadside devices relating to one intersection Ji include a traffic signal unit 1, a roadside detector 2, and a roadside communication device 3.

The traffic signal unit 1 includes: a plurality of traffic light units 11 installed on the respective inflow roads; and a traffic signal controller 12 connected to the traffic light units 11 via signal control lines 13.

Upon receiving the traffic signal control parameters from the central apparatus 6, the traffic signal controller 12 controls timing to change the light color of each traffic light unit 11 according to the received parameters (central-actuated control).

When the traffic signal controller 12 does not receive the traffic signal control parameters from the central apparatus 6, the traffic signal controller 12 executes fixed cycle control of setting traffic signal control parameters according to time periods. However, for some intersections Ji, the traffic signal controller 12 may execute local-actuated control such as gap-actuated control without changing the cycle length.

The roadside detector 2 and the roadside communication device 3 are connected to the traffic signal controller 12 via the communication lines 8. Therefore, the traffic signal controller 12 has a function of relaying wired communication through the communication lines 8 between the central apparatus 6, and the roadside detector 2 and the roadside communication device 3.

The roadside communication device 3 is installed near the intersection Ji so as to be able to wirelessly communicate with vehicles 5 traveling on the inflow roads to the intersection Ji. Therefore, the roadside communication device 3 can receive a communication frame, including vehicle information S1, which is exchanged between the vehicles 5 through vehicle-to-vehicle communication.

The roadside detector 2 transmits measured detector information to the traffic signal controller 12, and the traffic signal controller 12 transfers, to the central apparatus 6, the detector information received from the roadside detector 2. The roadside communication device 3 transmits, to the traffic signal controller 12, vehicle information S1 received from the on-vehicle communication units 4, and the traffic signal controller 12 transfers, to the central apparatus 6, the vehicle information S1 received from the roadside communication device 3.

However, the roadside detector 2 and the roadside communication device 3 may be communicably connected to the central apparatus 6 via an information relay device (not shown) or the like, other than the traffic signal controller 12, which is installed on the roadside.

The roadside communication device 3 can wirelessly transmit, to the on-vehicle communication units 4, downlink information S2 as information targeted to vehicles (roadside-to-vehicle communication). Examples of the downlink information S2 include "regulation information" of the roads included in the coverage area, and "road alignment information" near the intersection Ji.

Upon receiving the "regulation information" and the "road alignment information" from the traffic signal controller 12, the roadside communication device 3 can generate a communication frame in which these pieces of information are stored, and can broadcast the generated communication frame.

[Internal Configuration of Traffic Signal Controller]

Figure 3:
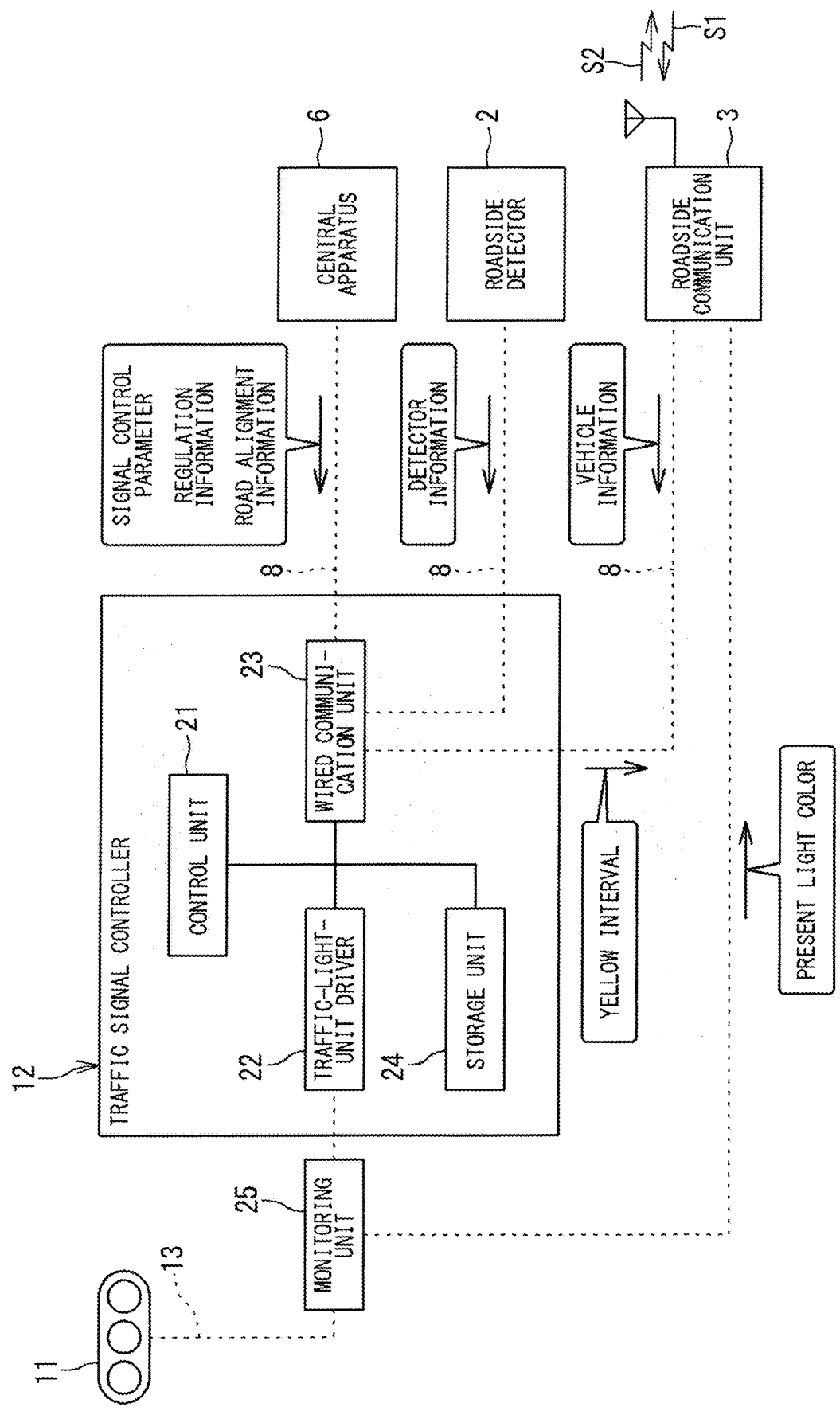
FIG. 3 is a block diagram showing an example of an internal configuration of a traffic signal controller.

FIG. 3 is a block diagram showing an example of the internal configuration of the traffic signal controller 12.

As shown in FIG. 3, the traffic signal controller 12 includes a control unit 21, a traffic-light-unit driver 22, a wired communication unit 23, and a storage unit 24.

The control unit 21 includes one or a plurality of microcomputers. The control unit 21 is connected to the traffic-light-unit driver 22, the wired communication unit 23, and the storage unit 24 via an internal bus. The control unit 21 controls the operations of the hardware units 22 to 24 in the housing of the traffic signal controller 12.

Based on the traffic signal control parameters transmitted from the central apparatus 6 and received by the wired communication unit 23, the control unit 21 generates a control signal for turning on/off each of the traffic lights constituting the traffic light unit 11, and outputs the generated control signal to the traffic-light-unit driver 22.

The traffic-light-unit driver 22 includes a semiconductor relay (not shown) configured to change the light color of the traffic light unit 11 in accordance with the control signal supplied from the control unit 21.

Specifically, in accordance with the control signal supplied from the control unit 21, the traffic-light-unit driver 22 turns on or off an AC voltage or a DC voltage to be supplied to each of the traffic lights of green, yellow, red, etc., included in the traffic light unit 11.

The traffic-light-unit driver 22 is connected to the traffic light unit 11 by the signal control line 13 including a power line. The signal control line 13 is provided with a current monitoring unit 25.

The monitoring unit 25 includes: an ammeter that monitors a current flowing from the traffic-light-unit driver 22 to the traffic light unit 11; and a communication unit that notifies the roadside communication device 3 about which traffic light (which color) is being supplied with a current. The communication unit of the monitoring unit 25 is connected to the roadside communication device 3 via a communication line 8.

Therefore, the monitoring unit notifies the roadside communication device 3 of "red" as the present light color while the current for "red" is on, notifies the roadside communication device 3 of "green" as the present light color while the current for "green" is on, and notifies the roadside communication device 3 of "yellow" as the present light color while the current for "yellow" is on.

In the example of FIG. 3, the monitoring unit 25 is present outside the housing of the traffic signal controller 12. However, the monitoring unit 25 may be provided inside the housing of the traffic signal controller 12.

The wired communication unit 23 is implemented as a communication interface that performs wired communication with the roadside detector 2, the roadside communication device 3, the central apparatus 6, etc.

Upon receiving the traffic signal control parameters from the central apparatus 6, the wired communication unit 23 transfers the received traffic signal control parameters to the control unit 21. Upon receiving the regulation information, the road alignment information, etc., from the central apparatus 6, the wired communication unit 23 transfers these pieces of information to the roadside communication device 3.

Upon receiving the detector information from the roadside detector 2, the wired communication unit 23 transfers the received detector information to the central apparatus 6.

Upon receiving the vehicle information S1 from the roadside communication device 3, the wired communication unit 23 transfers the received vehicle information S1 to the central apparatus 6.

The storage unit 24 is implemented as a hard disk, a semiconductor memory, or the like. The storage unit 24 has, stored therein, various kinds of computer programs to be executed by the control unit 21.

Examples of the computer programs stored in the storage unit 24 include: a program for relaying the various kinds of received data, such as the traffic signal control parameters, the regulation information, the road alignment information, the detector information, and the vehicle information S1, to appropriate destinations; and a program for generating a present light color described later and transmitting the present light color to the roadside communication device 3.

As described above, the monitoring unit 25 for the traffic-light-unit driver 22 of the traffic signal controller 12 transmits, to the roadside communication device 3, light color information at the present time point (present light color) as traffic signal information targeted to vehicles.

The roadside communication device 3 broadcasts a communication frame including the received present light color, to the vehicles 5 in each predetermined transmission cycle C1 (e.g., 100 milliseconds).

In addition to the present light color, the control unit 21 may transmit, to the wired communication unit 23, a yellow interval (e.g., 3 sec) at the intersection Ji corresponding to the traffic signal controller 12.

In this case, the wired communication unit 23 transmits the received yellow interval to the roadside communication device 3, and the roadside communication device 3 broadcasts, to the vehicles 5, a communication frame including the received yellow interval. The transmission cycle for the yellow interval may be longer than the transmission cycle C1 (e.g., 100 milliseconds) for the present light color.

If the traffic signal controller 12 is executing local-actuated control such as gap-actuated control, the control unit 21 may sometimes transmit, to the wired communication unit 23, the minimum number of remaining seconds and the maximum number of remaining seconds of green light, as traffic signal information representing the remaining green interval with a width.

In this case, the wired communication unit 23 transmits, to the roadside communication device 3, the received minimum number of remaining seconds and maximum number of remaining seconds of green light, and the roadside communication device 3 broadcasts a communication frame including the received minimum number of remaining seconds and maximum number of remaining seconds of green light, to the vehicles 5 in each predetermined transmission cycle C1.

[Internal Configuration of Automated Vehicle]

Figure 4:
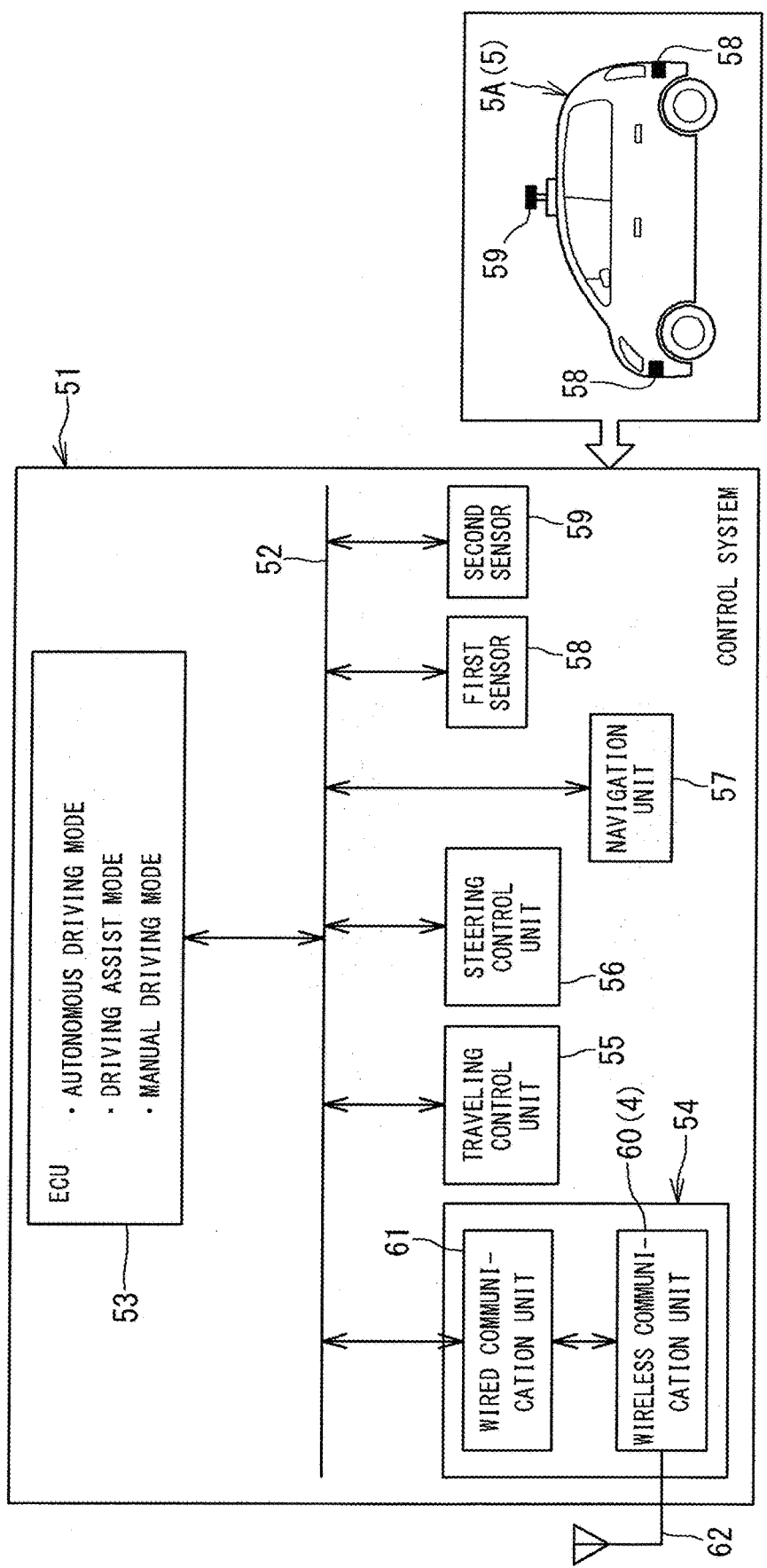
FIG. 4 is a block diagram showing an example of a control system of an automated vehicle.

FIG. 4 is a block diagram showing an example of a control system 51 of an automated vehicle 5A.

As shown in FIG. 4, the automated vehicle 5A according to the present embodiment includes the control system 51 which is an on-vehicle control device for automated driving. The control system 51 includes a vehicle control unit 53, a communication device 54, a traveling control unit 55, a steering control unit 56, a navigation unit 57, first sensors 58, and a second sensor 59 which are communicably connected to each other via an internal bus 52.

The vehicle control unit 53 is implemented as an ECU (Electronic Control Unit), and has a storage device (not shown) therein. The vehicle control unit 53 reads out a computer program stored in the storage device and executes the computer program to control the operations of the respective units in the control system 51.

The communication device 54 includes a wireless communication unit 60 that performs a wireless communication function, and a wired communication unit 61 that performs an in-vehicle wired communication function. The aforementioned on-vehicle communication unit 4 corresponds to the wireless communication unit 60 of the communication device 54 shown in FIG. 4.

An RF signal that the wireless communication unit 60 receives is a modulated signal of a communication frame including vehicle information S1 from another vehicle 5, downlink information S2 from the roadside communication device 3, etc.

The wireless communication unit 60 demodulates the RF signal acquired by an antenna 62 to reproduce the communication frame, extracts the vehicle information S1 or the downlink information S2 from the reproduced communication frame, and transmits the extracted information to the wired communication unit 61. The wired communication unit 61 transfers, to the vehicle control unit 53, the information S1 or S2 received from the wireless communication unit 60.

An RF signal that the wireless communication unit 60 transmits is a modulated signal of a communication frame including vehicle information S1 of the corresponding vehicle, or the like.

The vehicle control unit 53 generates vehicle information S1 and transmits the vehicle information S1 to the wired communication unit 61, and the wired communication unit 61 transfers the received vehicle information S1 to the wireless communication unit 60. The wireless communication unit 60 generates a communication frame including the received vehicle information S1, modulates the generated communication frame into an RF signal, and outputs the RF signal through the antenna 62.

The traveling control unit 55 is a control unit for performing control regarding traveling of the vehicle 5.

Examples of the control performed by the traveling control unit 55 include: acceleration/deceleration control for adjusting the rotation speed of an engine, an electric motor, or the like, according to the amount of depression of an accelerator pedal; braking control for adjusting the hydraulic force of a hydraulic brake according to the amount of depression of a brake pedal; and transmission control for a torque converter.

The steering control unit 56 is a control unit for performing control regarding steering of the vehicle 5.

Examples of the control performed by the steering control unit 56 include: direction control for adjusting the steering angle of front wheels according to the amount of rotation of a steering wheel; lighting control for controlling flashing of lamps such as a blinker; and ABS (Antilock Brake System) control for maintaining the steerable state by preventing tires from being locked due to sudden braking.

The navigation unit 57 includes: a route search unit, implemented as a computer device, for searching for an optimum route for the vehicle traveling to a destination; an operation unit for making an input to the route search unit; and a display and a loudspeaker for guiding an occupant with a route as an operation result by means of an image or a voice.

Generally, the route search unit calculates a minimum cost route having the minimum link cost, according to a specific route search logic. As this route search logic, for example, the Dijkstra method or the potential method is adopted.

The navigation unit 57 includes: a time synchronization function of acquiring the present time from a GPS signal; a position detection function of measuring the present position (latitude, longitude, and altitude) of the vehicle from the GPS signal; a heading detection function of measuring the heading and the angular velocity of the vehicle by using a heading sensor.

The navigation unit 57 is also provided with a storage device in which road map data is stored. The road map data is used for map matching of positional information of the vehicle when the route search unit performs a search process.

The first sensors 58 are implemented as ultrasonic sensors, video cameras, or the like placed at four corners, i.e., front-left, front-right, rear-left and rear-right corners, of the vehicle 5.

The first sensors 58 provided on the front side are sensors mainly for detecting presence of objects forward of the vehicle, while the first sensors 58 provided on the rear side are sensors mainly for detecting presence of objects rearward of the vehicle.

The second sensor 59 is implemented as an ultrasonic sensor, a video camera, or the like placed on the roof of the vehicle 5, for example.

The second sensor 59 is rotatable around a vertical shaft at a relatively high speed. The second sensor 59 is a sensor for detecting presence of objects around the vehicle.

The vehicle control unit 53 can perform automated driving (hereinafter also referred to as "driving assist") of any of levels 1 to 3, based on the sensing result of the first sensor 58.

An example of control for driving assist is as follows. That is, risk of collision is estimated based on the distance between the vehicle and an object detected by the first sensor 58. When the risk of collision is determined to be high, the units 55 to 57 are instructed to perform deceleration interference control or make an alert to the occupant.

Based on the sensing result of any of the first and second sensors 58 and 59, the vehicle control unit 53 can perform automated driving of level 4 (hereinafter also referred to as "autonomous driving").

An example of control for autonomous driving is as follows. A behavior that an object detected by any of the first and second sensors 58 and 59 will take is predicted through, for example, deep learning of behaviors in the past. Based on the predicted behavior, the units 55 to 57 are instructed to direct the vehicle toward a target position.

The vehicle control unit 53 may switch the driving mode to manual driving by an occupant without using the sensing results of the first and second sensors 58 and 59.

As described above, the control system 51 of the automated vehicle 5A according to the present embodiment can execute the autonomous driving mode, and either the driving assist mode or the manual driving mode as a downgraded operation mode. Switching of the operation mode is performed based on an operation input manually performed by an occupant, or a control instruction from a portable device such as a smartphone.

[Hazardous Zone Before Intersection at Start of Yellow Light]

Figure 5:
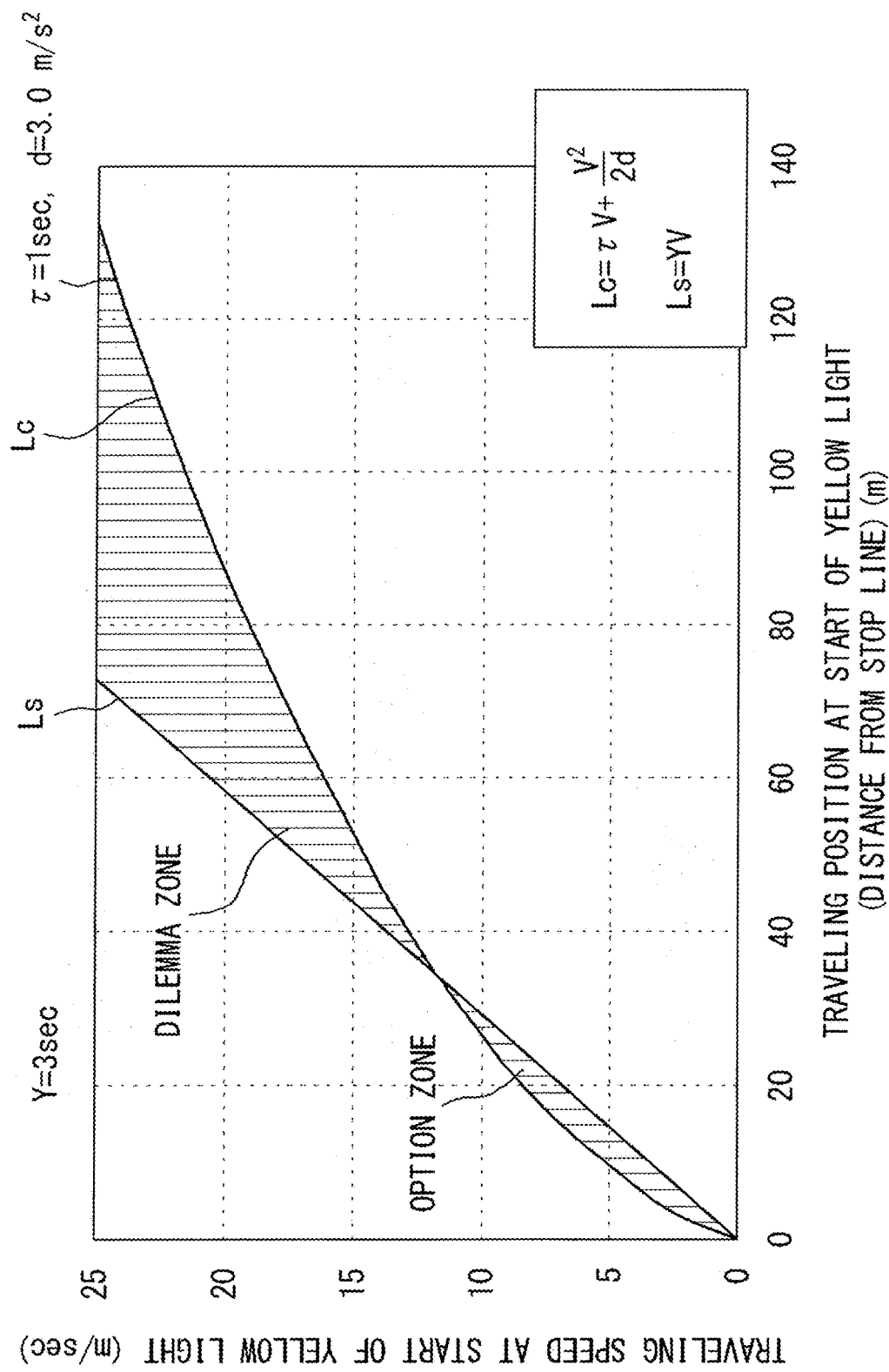
FIG. 5 is a graph showing a relationship between the traveling position and the traveling speed of a vehicle that enters an intersection at start of yellow light.

FIG. 5 is a graph showing a relationship between the traveling position and the traveling speed, at start of yellow light, of a vehicle 5 that enters an intersection Ji.

In the graph shown in FIG. 5, the horizontal axis indicates the traveling position (distance m from a stop line), at the start of yellow light, of the vehicle 5 that enters the intersection Ji, and the vertical axis indicates the traveling speed (m/sec), at the start of yellow light, of the vehicle 5 that enters the intersection Ji.

When traffic is off-peak, switching of the traffic light phase is likely to cause traffic accidents, such as collision accident immediately after start of yellow light and collision accident due to sudden encounter of vehicles that enter the intersection Ji with an all-red phase.

The reason is as follows. When switching of the traffic light phase is performed, the driver sometimes falls into a situation that he/she cannot decide whether to stop before the intersection Ji or pass through the intersection Ji. This situation is also likely to occur when the vehicle 5 is present in a "dilemma zone" where the vehicle 5 can neither normally stop nor pass through, or when the vehicle 5 is in an "option zone" where the vehicle 5 can stop or pass through.

In particular, it is known that, if the vehicle 5 present in the dilemma zone tries to forcefully enter the intersection Ji, this vehicle 5 is likely to cause sudden-encounter collision accident.

In FIG. 5, each of the two zones is formed of an area surrounded by a curved line Lc and a straight line Ls. The dilemma zone is an area satisfying Ls>Lc, and the option zone is an area satisfying Lc>Ls. The curved line Lc and the straight line Ls are defined by the following expressions:

$$Lc = \tau \times V + (\tfrac{1}{2}d) \times V^2 \qquad (1)$$

$$Ls = Y \times V \qquad (2)$$

The meanings of variables and coefficients in the above calculation expressions (1) and (2) are as follows.

τ: system delay time (delay time from when yellow light is started to when the brake starts to be effective) [sec];

V: approach speed [m/sec] of the vehicle at the start of yellow light;

d: average deceleration [m/sec$^2$] from when the brake starts to be effective to when the vehicle stops; and Y: time length of yellow light [sec]

In the calculation expression (1) for the curved line Lc forming a lower side of the dilemma zone, the delay time τ and the deceleration d are a coefficient for the speed V and a coefficient for the square of the speed V, respectively.

For example, in the traffic signal controller 12 that executes "dilemma-actuated control" as a kind of local-actuated control, the delay time τ in calculation expression (1) is set to about 1 second as a reaction time from when the driver visually recognizes the yellow light to when braking is started, and the deceleration d is set to about 2.0 to 3.0 m/sec$^2$.

[Problem and Solution Thereof at Intersection where Present Light Color is Provided]

Figure 6:
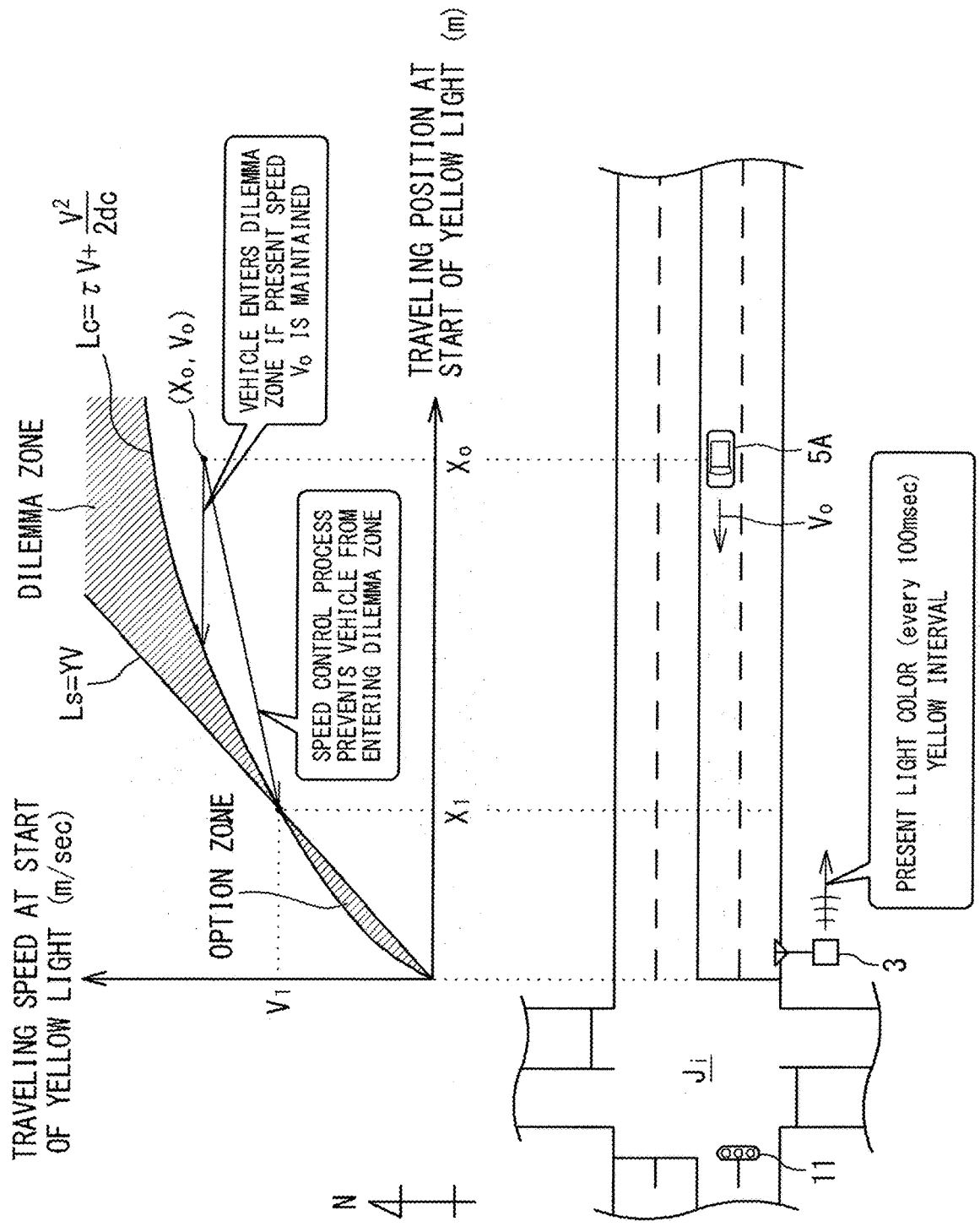
FIG. 6 is a road plan view showing a problem in the case where an automated vehicle enters an intersection at which a present light color is provided.

FIG. 6 is a road plan view showing a problem that occurs when an automated vehicle 5A enters an intersection Ji where the present light color is provided.

In FIG. 6, the automated vehicle 5A is traveling westward on the inflow road on the east side of the intersection Ji. The present position (distance from the stop line) and the present speed of the automated vehicle 5A are denoted by X0 and V0, respectively. In FIG. 6, dc denotes a deceleration (set value) stored in the control system 51 of the automated vehicle 5A. When the control system 51 causes the vehicle 5A to stop, the deceleration speed dc is a predetermined maximum deceleration (e.g., 0.2 to 0.3 G) that allows safe stop of the vehicle 5A. The same applies to dc in FIG. 8.

A position X1 corresponding to a point of intersection (X1, V1) of the curved line Lc and the straight line Ls that defines the dilemma zone is referred to as "dilemma avoidance position", and a speed V1 at the point of intersection (X1, V1) is referred to as "dilemma avoidance speed". Calculation expressions for X1 and V1 are as follows:

$$X1 = 2dc \times (Y-\tau) \times Y$$

$$V1 = 2dc \times (Y-\tau)$$

The system delay time τ (set value) stored in the control system 51 of the automated vehicle 5A is the sum of a delay time from when yellow light is started to when the roadside communication device 3 completes provision of information, and a delay time from when the automated vehicle 5A receives the information to when the automated vehicle 5A starts braking.

Further, as shown in FIG. 6, it is assumed that the present position X0 of the automated vehicle 5A is on the upstream side relative to the dilemma avoidance position X1 and the present speed V0 of the automated vehicle 5A is higher than the dilemma avoidance speed V1.

At the intersection Ji shown in FIG. 6, the vehicle 5 is provided with the present light color but is not provided with the remaining number of seconds (e.g., remaining green interval) of the present light color. In this case, the vehicle 5 traveling on the inflow road cannot accurately determine the yellow light start time in advance.

Therefore, even when the present speed V0 at the present position X0 is actually higher than the dilemma avoidance speed V1, there is a risk that the automated vehicle 5A may continue to travel westward while maintaining the present speed V0, enter the dilemma zone, and ignore the traffic light or rapidly decelerate.

In the automated vehicle 5A according to the present embodiment, assuming that the present light color will be changed to yellow at any timing, the vehicle control unit 53 of the control system 51 executes a speed control process of reducing the traveling speed in advance on the upstream side of the dilemma avoidance position X1.

Thus, the automated vehicle 5A traveling on the upstream side of the dilemma avoidance position X1 is prevented from entering the dilemma zone. Hereinafter, a specific example of the speed control process to be executed by the vehicle control unit 53 according to the present embodiment will be described.

[Speed Control Process by the Vehicle Control Unit]

Figure 7:
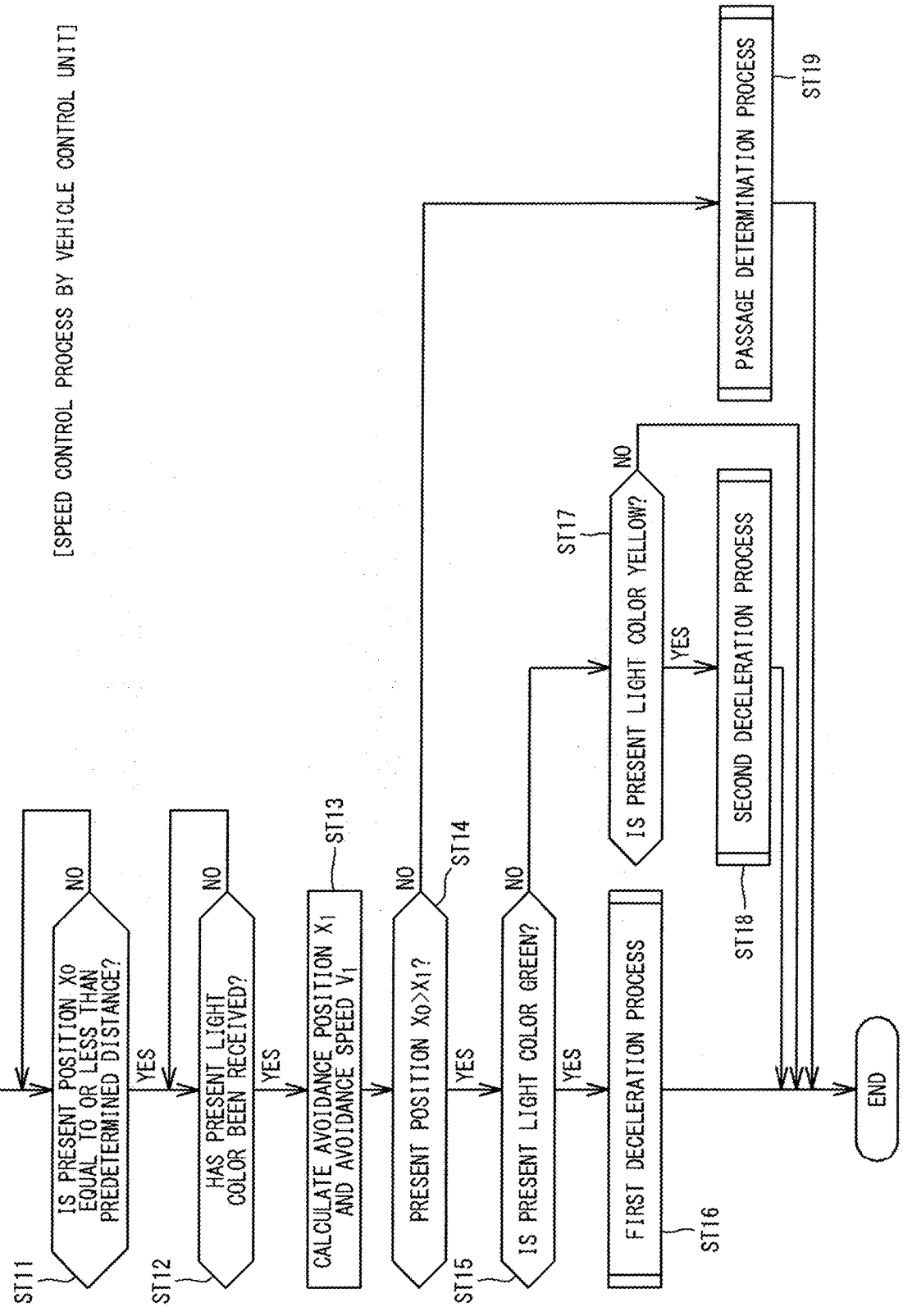
FIG. 7 is a flowchart showing an example of a speed control process performed by a vehicle control unit of an automated vehicle.

FIG. 7 is a flowchart showing an example of a speed control process by the vehicle control unit 53 of the automated vehicle 5A.

The vehicle control unit 53 executes the speed control process shown in FIG. 7 in each predetermined control cycle C2 (e.g., 100 to 200 m/sec) equal to or longer than the transmission cycle C1 (e.g., 100 m/sec) for present light color. The vehicle control unit 53 ends the speed control process when the vehicle has passed through the intersection Ji.

In the speed control process shown in FIG. 7, the vehicle control unit 53 firstly determines whether or not the distance from the present position X0 of the vehicle to the intersection Ji is equal to or shorter than a predetermined distance (e.g., 150 to 200 m) (step ST11).

When the determination result in step ST11 becomes positive, the vehicle control unit 53 further determines whether or not the present light color has been received from the roadside communication device 3 at the intersection Ji (step ST12).

When the determination result in step ST12 becomes positive, the vehicle control unit 53 calculates a dilemma avoidance position (hereinafter referred to as "avoidance position") X1 and a dilemma avoidance speed (hereinafter referred to as "avoidance position") V1 at the start of yellow light (step ST13).

The calculation process in step ST13 is executed as follows. That is, the delay time τ and the deceleration dc stored in the vehicle control unit 53 in advance and the yellow interval Y received from the roadside communication device 3 are substituted into calculation expressions (1) and (2) for the curved line Lc and the straight line Ls, respectively, and then a point of intersection between the curved line Lc and the straight line Ls is calculated.

Regarding the yellow interval Y, it is often set to substantially the same time length (e.g., about 3 sec) at every intersection Ji.

Therefore, when the yellow interval Y is not provided from the roadside communication device 3, a set value of a yellow interval Y (e.g., a set value that is a little smaller than 3 sec so that the dilemma zone is calculated to be larger for the sake of safety), which is stored in the vehicle control unit 53 in advance, may be used. The vehicle control unit 53 may always use the set value.

Next, the vehicle control unit 53 determines whether or not the present position X0 is greater than the avoidance position X1 (step ST14).

When the determination result in step ST14 is positive, the vehicle control unit 53 further determines whether or not the present light color received from the roadside communication device 3 is "green" (step ST15).

When the determination result in step ST14 is negative, the vehicle control unit 53 executes a "passage determination process" (step ST19) and then ends the speed control process.

When the determination result in step ST15 is positive, the vehicle control unit 53 executes a "first deceleration process" (step ST16) and then ends the speed control process.

When the determination result in step ST15 is negative, the vehicle control unit 53 further determines whether or not the present light color received from the roadside communication device 3 is "yellow" (step ST17).

When the determination result in step ST17 is positive, the vehicle control unit 53 executes a "second deceleration process" (step ST18) and then ends the speed control process.

When the determination result in step ST17 is negative, the vehicle control unit 53 ends the speed control process without executing the first and second deceleration processes (steps ST16 and ST18).

[Specific Examples of First and Second Deceleration Processes and Intersection Passing Process]

Figure 8:
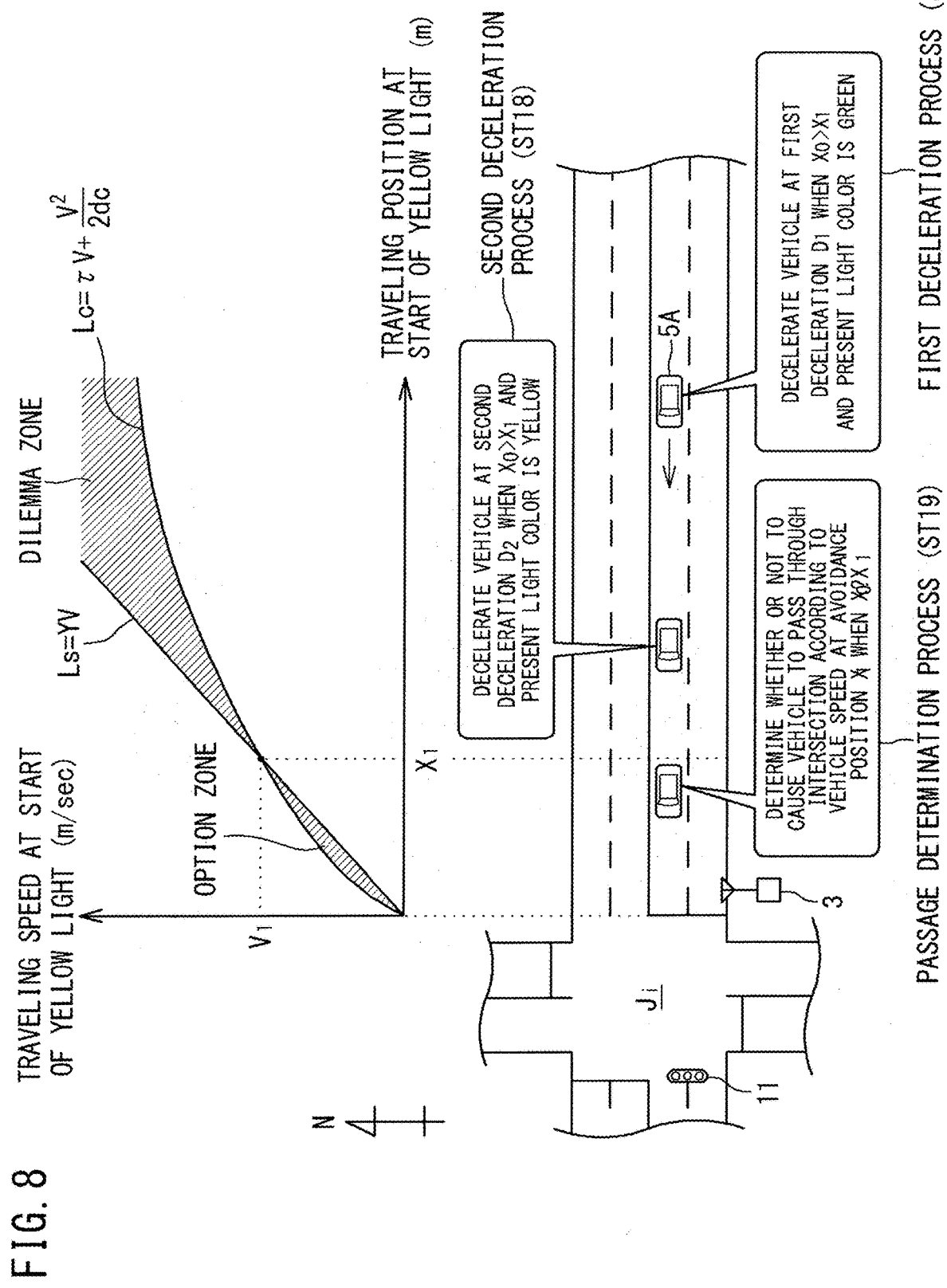
FIG. 8 is a road plan view showing examples of first and second deceleration processes and an intersection passing process.

FIG. 8 is a road plan view showing examples of the first and second deceleration processes and the intersection passing process (steps ST16, ST18, and ST19 in FIG. 7).

As shown in FIG. 8, the first deceleration process (step ST16) by the vehicle control unit 53 is a process of decelerating the vehicle according to a first deceleration D1 when the present position X0 of the vehicle is on the upstream side relative to the avoidance position X1 (X0>X1) and the present light color is "green".

The first deceleration D1 is a deceleration for reducing the present speed V0 (>V1) of the vehicle at the avoidance position X1 to be equal to or lower than the avoidance speed V1.

Specifically, the vehicle control unit 53 calculates the first deceleration D1 according to the following expression, for example. In the expression, c is a delay time from when calculation of the first deceleration D1 is started to when braking is started.

$$D1=(V0^2-V1^2)/\{(X0-X1)-\varepsilon \times V\}\times 2$$

In this case, the vehicle control unit 53 may start deceleration of the vehicle according to the first deceleration D1, at the present position X0 where the vehicle has received the present light color (=green).

Alternatively, the vehicle control unit 53 may add a margin a to the first deceleration D1 calculated by the above expression. In this case, the vehicle control unit 53 may start deceleration of the vehicle according to the first deceleration D1 with the margin a, at a traveling position (X0−ΔX) slightly downstream from the present position X0.

According to the control system 51 of the present embodiment, since the vehicle control unit 53 executes the first deceleration process. Therefore, when the present light color at the intersection Ji is green, the automated vehicle 5A at the present position X0 maintains the present speed V0 (>V1) so as not to enter the dilemma zone, whereby the automated vehicle 5A is prevented from entering the dilemma zone, on the upstream side of the avoidance position X1.

When X0>X1 and the present light color is green, if the present speed V0 is already equal to or lower than the avoidance speed V1 (V0≤V1), entering of the vehicle into the dilemma zone is avoided even if the first deceleration process is not executed.

Therefore, in this case, the vehicle control unit 53 may maintain the present speed V0 (≤V1) of the vehicle without executing the first deceleration process.

As shown in FIG. 8, the second deceleration process (step ST18) by the vehicle control unit 53 is a process of decelerating the vehicle according to a second deceleration D2 when the present position X0 of the vehicle is on the upstream side relative to the avoidance position X1 (X0>X1) and the present light color is "yellow".

The second deceleration D2 is a deceleration for causing the vehicle to stop before the stop line at the intersection Ji, within a predetermined deceleration range (deceleration equal to or lower than dc) that allows the vehicle to stop safely.

In this case, the vehicle control unit 53 may start deceleration of the vehicle according to the second deceleration D2 at any traveling position X2 within a range from the present position X0 where the vehicle has received the present light color (=yellow) to a lower-limit avoidance position Xc (Xc=V0$^2$/(2×dc)) at which the vehicle can stop at the maximum deceleration dc. The second deceleration D2 is variable according to the distance from the brake start position X2 to the stop line, and a calculation expression therefor is D2=V0$^2$/(2×X2).

According to the control system 51 of the present embodiment, since the vehicle control unit 53 executes the second deceleration process, the automated vehicle 5A is prevented from forcefully entering the intersection Ji when the present light color at the intersection Ji has changed from green to yellow.

For example, the vehicle control unit 53 may cause the vehicle to decelerate to the avoidance speed V1 according to the first deceleration D1 until the vehicle arrives at the avoidance position X1, and may cause the vehicle to stop according to the deceleration dc from a time point when the vehicle has exceeded the avoidance position X1.

As shown in FIG. 8, the passage determination process (step ST19) by the vehicle control unit 53 is a process of determining whether or not to cause the vehicle to pass through the intersection Ji, according to the speed of the vehicle at the avoidance position X1, in the case where the present position X0 of the vehicle coincides with the avoidance position X1 or is on the downstream side relative to the avoidance position X1 (X0≤X1).

Specifically, when the present light color is "yellow" or "green", the vehicle control unit 53 determines whether or not to cause the vehicle to pass through the intersection Ji in accordance with the level of the present speed V0 of the vehicle at the avoidance position X1.

For example, in the case where the present speed V0 at the avoidance position X0 is equal to or higher than the avoidance speed V1, the vehicle control unit 53 may control the traveling speed of the vehicle so that the vehicle rapidly passes through the intersection Ji, by maintaining the present speed V0 or by accelerating the vehicle with the speed limit being an upper limit.

For example, in the case where the present speed V0 at the avoidance position X1 is lower than the avoidance speed V1 due to influences of surrounding vehicles and the present speed V0 is equal to or lower than a predetermined speed that allows the vehicle to stop before the stop line, the vehicle control unit 53 may control the traveling speed of the vehicle so that the vehicle stops before the stop line.

According to the control system 51 of the present embodiment, since the vehicle control unit 53 executes the passage determination process according to the vehicle speed at the avoidance position X1, it is possible to appropriately determine whether the vehicle should pass through the intersection Ji or should stop before the intersection Ji.

First Modification

In the embodiment described above, the intersection Ji at which the automated vehicle 5A executes the speed control process may be an intersection at which a remaining green interval is provided as traffic signal information with a width, specifically, an intersection at which the minimum number of remaining seconds Gmin and the maximum number of remaining seconds Gmax of green light are provided.

At an intersection Ji where a local-actuated control such as "gap-actuated control" of aborting the green light when the inter-vehicular distance (gap) becomes equal to or longer than a predetermined value, the aforementioned traffic signal information with the width may sometimes be provided. Examples of the local-actuated control, in which the traffic signal information with the width is provided, include gap-actuated control, bus-actuated control, dilemma-actuated control, pedestrian-actuated control, and high-speed-actuated control.

Even when the minimum number of remaining seconds Gmin and the maximum number of remaining seconds Gmax of green light are further provided in addition to the present light color, the vehicle 5 traveling on the inflow road cannot accurately determine the yellow light start time.

Therefore, as in the case of the intersection Ji shown in FIG. 6 at which the present light color is provided but the remaining number of seconds of the present light color is not provided, there is a risk that the automated vehicle 5A may continue to travel westward while maintaining the present speed V0, and enter the dilemma zone. Then, the automated vehicle 5A may ignore the traffic light or rapidly decelerate.

Therefore, the vehicle control unit 53 of the automated vehicle 5A preferably executes the speed control process shown in FIG. 7 even in the case where an intersection on the downstream side through which the vehicle 5A will pass is an intersection Ji at which local-actuated control such as gap-actuated control is executed.

In this case, as a calculation expression for a straight line that defines a dilemma zone, the vehicle control unit 53 adopts the following expression (3) including the minimum number of remaining seconds Gmin before change to yellow.

$$Lsg=(Y+G\min)V \quad (3)$$

Thus, based on the present position X0 and the present speed V0 at the time point when the yellow start time is determined (at the time point when the minimum number of remaining seconds Gmin of green light becomes equal to the maximum number of remaining seconds Gmax of green light), the vehicle control unit 53 determines whether or not the vehicle 5A can pass through the stop line before the yellow ends. When the vehicle control unit 53 has determined to stop the vehicle 5A, the vehicle 5A can be safely stopped at a deceleration equal to or lower than dc.

In addition, the vehicle control unit 53 regards a position X1 corresponding to a point of intersection (X1, V1) of a curved line Lc and a straight line Lsg that define the dilemma zone, as "dilemma avoidance position", and regards a speed V1 at the point of intersection (X1, V1) as "dilemma avoidance speed".

In order to prevent the dilemma avoidance speed V1 from becoming excessively low, it is desirable that actuated control is executed only in a pedestrian green stage to ensure the minimum remaining time of green light (a total of intervals of a pedestrian flash stage and a pedestrian red stage). Meanwhile, in the case of an intersection Ji at which actuated control is executed in the pedestrian red stage, it is desirable that the yellow interval at the intersection Ji is set longer than usual, taking a delay time r into account.

Second Modification

As in the embodiment described above, also, in the case of the intersection Ji at which only the present light color (or only the present light color and the yellow interval) is provided, in order to inhibit the dilemma avoidance speed V1 from becoming excessively low, it is desirable that the yellow interval at the intersection Ji is set longer than usual taking, for example, the delay time T into account.

For example, in the case where the avoidance speed V1 is desired to be equal to or higher than "speed limit—10 km/h" on the infrastructure side (the traffic signal controller 12 at the intersection Ji), the yellow interval Y=3.3 sec according to a relational expression of V1=2d×(Y−τ) when the speed limit=50 km/h, the average deceleration d=2.0 m/sec², and the delay time τ=0.5 sec.

Third Modification

In the embodiment described above, when the control unit 21 of the traffic signal controller 12 has determined that reduction in speed of the automated vehicle 5A when green light is aborted is insufficient, the control unit 21 may execute actuated control to extend yellow interval so that the automated vehicle 5A can appropriately pass through the intersection Ji.

Specifically, the control unit 21 of the traffic signal controller 12 determines that reduction in speed of the automated vehicle 5A is insufficient, when the following inequality is established. In the inequality, L is an idle running distance (e.g., 8 m) that can occur before braking.

$$V0^2/\{2\times(X0-L)\} > \text{predetermined threshold of deceleration } d$$

In this case, the control unit 21 may extend the yellow interval at the intersection Ji so that the following relationship is satisfied:

traveling position $X0$/traveling speed $V0$ < extended yellow interval

Fourth Modification

In the embodiment described above, the vehicle control unit 53 of the automated vehicle 5A executes the speed control process shown in FIG. 7 by using the present light color and the yellow interval that are received by the wireless communication unit 60 from the roadside communication device 3 at the intersection Ji. However, the vehicle control unit 53 may execute the speed control process shown in FIG. 7 by using the present light color acquired by the first sensor 58 of the vehicle (refer to FIG. 4: specifically, a front-side video camera or the like of the vehicle 5) and a standard yellow interval that is stored in advance.

Thus, the speed control process shown in FIG. 7 can be executed even when the intersection Ji is not provided with the roadside communication device 3 or when the present light color cannot be received because of poor communication condition of the roadside communication device 3.

Other Modifications

The embodiments described above are illustrative and not restrictive. The scope of the invention is indicated not by the embodiments described above but by the appended claims, and all changes which come within the meaning and range of equivalency of the claims are therefore intended to be embraced therein.

For example, in the embodiments described above, it is enough for the automated vehicle 5A to conform to the driving assist mode including speed control. In other words, the automated vehicle 5A may be a vehicle 5 that does not execute the autonomous driving mode.

REFERENCE SIGNS LIST 1 traffic signal unit
2 roadside detector
3 roadside communication device
4 on-vehicle communication unit
5 vehicle
5A automated vehicle
5B usual vehicle
6 central apparatus
7 router
8 communication line
11 traffic light unit
12 traffic signal controller
13 signal control line
21 control unit
22 traffic-light-unit driver
23 wired communication unit
24 storage unit
51 control system
52 internal bus
53 vehicle control unit (calculation unit, control unit)
54 communication device
55 traveling control unit
56 steering control unit
57 navigation unit
58 first sensor (acquisition unit)
59 second sensor
60 wireless communication unit (acquisition unit)
61 wired communication unit
62 antenna

The invention claimed is:
1. An on-vehicle control device configured to control a traveling speed of a vehicle including the on-vehicle control device, the on-vehicle control device comprising:
an acquisition unit configured to acquire a present light color of a traffic light unit installed at an intersection, from a communication device outside the vehicle or a sensor mounted on the vehicle;
a calculation unit configured to calculate an avoidance position and an avoidance speed with respect to a dilemma zone at a time when yellow light starts, by using a yellow interval of the traffic light unit, a deceleration of the vehicle, and a system delay time of the vehicle; and a control unit configured to execute a first deceleration process of reducing the traveling speed of the vehicle at the avoidance position to a speed equal to or lower than the avoidance speed, in a case where a present position of the vehicle is on an upstream side relative to the avoidance position, the present light color is green, and a distance from the intersection to the present position of the vehicle is larger than a distance from the intersection to the avoidance position, wherein the avoidance position and the avoidance speed are calculated from coordinates of an intersection of a straight line Ls and a curve Lc defined by the following:

$$Ls = Y \times V$$

$$Lc = \tau \times V + (\frac{1}{2}d) \times V^2,$$

where $\tau$ is the system delay time of the vehicle, V is the traveling speed of the vehicle, d is the deceleration of the vehicle, and Y is the yellow interval of the traffic light unit.

2. The on-vehicle control device according to claim 1, wherein the control unit executes a second deceleration process of causing the vehicle to stop before the intersection, in a case where the present position of the vehicle is on the upstream side relative to the avoidance position and the present light color is yellow.

3. The on-vehicle control device according to claim 1, wherein the control unit executes a passage determination process of determining whether or not to cause the vehicle to pass through the intersection, according to the speed of the vehicle at the avoidance position, in a case where the present position of the vehicle coincides with the avoidance position or is on a downstream side relative to the avoidance position.

4. The on-vehicle control device according to claim 1, wherein in a case where the acquisition unit acquires, as traffic signal information at the intersection, only the traffic light color or only the traffic light color and the yellow interval, the calculation unit calculates the avoidance position and the avoidance speed by using the straight line Ls.

5. The on-vehicle control device according to claim 1, wherein in a case where the acquisition unit further acquires, as traffic signal information at the intersection, traffic signal information in which a minimum number of remaining seconds of green light is different from a maximum number of remaining seconds of the green light, the calculation unit calculates the avoidance position and the avoidance speed by using a straight line Lsg described below:

$$Lsg = (Y + G\ min) \times V$$

where Y is the yellow interval, Gmin is the minimum number of remaining seconds, and V is the traveling speed.

6. A method of controlling a traveling speed of a vehicle, which is executed by an on-vehicle control device that controls the traveling speed of the vehicle, the method comprising:

acquiring a present light color of a traffic light unit installed at an intersection, from a communication device outside the vehicle or a sensor mounted on the vehicle;

calculating an avoidance position and an avoidance speed with respect to a dilemma zone at a time when yellow light starts, by using a yellow interval of the traffic light unit, a deceleration of the vehicle, and a system delay time of the vehicle; and executing a first deceleration process of reducing the traveling speed of the vehicle at the avoidance position to a speed equal to or lower than the avoidance speed, in a case where a present position of the vehicle is on an upstream side relative to the avoidance position, the present light color is green, and a distance from the intersection to the present position of the vehicle is larger than a distance from the intersection to the avoidance position, wherein the avoidance position and the avoidance speed are calculated from coordinates of an intersection of a straight line Ls and a curve Lc defined by the following:

$$Ls = Y \times V$$

$$Lc = \tau \times V + (\frac{1}{2}d) \times V^2,$$

where $\tau$ is the system delay time of the vehicle, V is the traveling speed of the vehicle, d is the deceleration of the vehicle, and Y is the yellow interval of the traffic light unit.

7. A non-transitory computer readable storage medium storing a computer program configured to cause a computer to function as an on-vehicle control device that controls a traveling speed of a vehicle including the on-vehicle control device, the computer program causing the computer to function as:

an acquisition unit configured to acquire a present light color of a traffic light unit installed at an intersection, from a communication device outside the vehicle or a sensor mounted on the vehicle;

a calculation unit configured to calculate an avoidance position and an avoidance speed with respect to a dilemma zone at a time when yellow light starts, by using a yellow interval of the traffic light unit, a deceleration of the vehicle, and a system delay time of the vehicle; and a control unit configured to execute a first deceleration process of reducing the traveling speed of the vehicle at the avoidance position to a speed equal to or lower than the avoidance speed, in a case where a present position of the vehicle is on an upstream side relative to the avoidance position, the present light color is green, and a distance from the intersection to the present position of the vehicle is larger than a distance from the intersection to the avoidance position, wherein the avoidance position and the avoidance speed are calculated from coordinates of an intersection of a straight line Ls and a curve Lc defined by the following:

$$Ls = Y \times V$$

$$Lc = \tau \times V + (\frac{1}{2}d) \times V^2,$$

where $\tau$ is the system delay time of the vehicle, V is the traveling speed of the vehicle, d is the deceleration of the vehicle, and Y is the yellow interval of the traffic light unit.

* * * * *